United States Patent [19]

Sato et al.

[11] Patent Number: 4,550,375

[45] Date of Patent: Oct. 29, 1985

[54] MACHINING SYSTEM WITH OPERATING MODE SELECTORS PROVIDED IN MACHINE CONTROLLER OF EACH NC MACHINE TOOL

[75] Inventors: Makoto Sato, Kanagawa; Kazuyuki Hiramoto, Sagamihara, both of Japan

[73] Assignee: Makino Milling Machine Co., Ltd., Tokyo, Japan

[21] Appl. No.: 464,375

[22] Filed: Feb. 7, 1983

[30] Foreign Application Priority Data

Feb. 13, 1982 [JP] Japan .................................. 57-20696

[51] Int. Cl.[4] ........................ G06F 15/46; G05B 19/29
[52] U.S. Cl. .................................... 364/474; 364/167; 364/138; 318/569; 318/600
[58] Field of Search ............... 364/474, 475, 167, 168, 364/169, 170, 171, 138, 139, 200 MS File, 900 MS File; 318/569, 590, 600

[56] References Cited

U.S. PATENT DOCUMENTS

| | | | |
|---|---|---|---|
| 3,636,525 | 1/1972 | Inaba et al. | 364/138 |
| 4,029,950 | 6/1977 | Haga | 364/138 X |
| 4,199,814 | 4/1980 | Rapp et al. | 364/474 |
| 4,251,858 | 2/1981 | Cambigue et al. | 364/474 X |
| 4,263,647 | 4/1981 | Merrell et al. | 364/171 X |
| 4,288,849 | 9/1981 | Yoshida et al. | 364/167 X |
| 4,433,383 | 2/1984 | Maurer | 364/474 |
| 4,435,771 | 3/1984 | Nozawa et al. | 364/474 |
| 4,456,951 | 6/1984 | Henneberger et al. | 364/167 X |
| 4,473,883 | 9/1984 | Yoshida et al. | 364/474 |

Primary Examiner—Joseph Ruggiero
Assistant Examiner—Jon D. Grossman
Attorney, Agent, or Firm—McAulay, Fields, Fisher, Goldstein & Nissen

[57] ABSTRACT

A machining system for controlling the operation of a plurality of NC machine tools with a master controller, which is provided with an operation mode selector in a machine controller of each NC machine tool, and which is suitable for efficiently machining metal molds. The machining system allows the operator to quickly respond to a change in the condition of the production site and progress the machining operation of each NC machine tool only by manipulating the operation mode selectors without changing the machining sequence registered in advance in the master controller according to the production plan.

20 Claims, 15 Drawing Figures

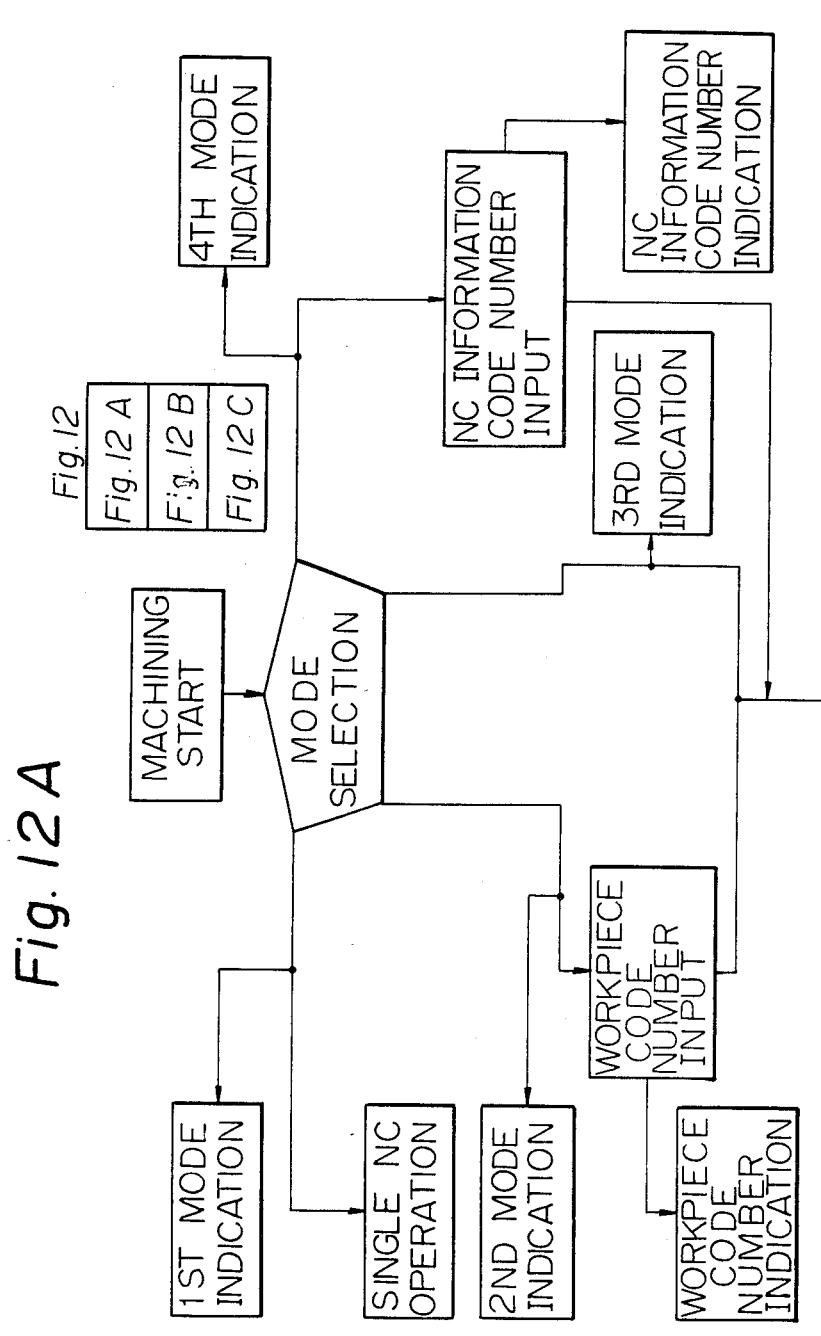

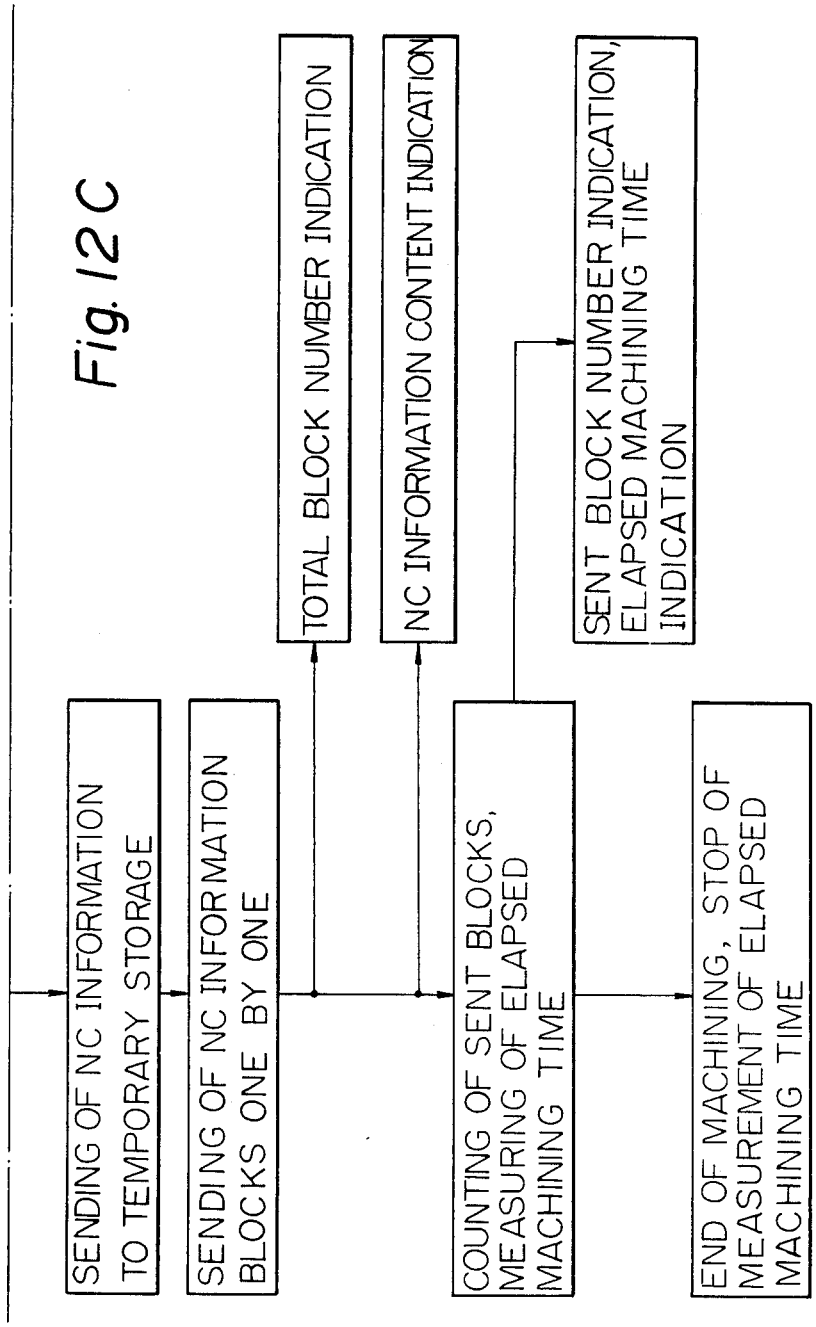

MACHINING SYSTEM WITH OPERATING MODE SELECTORS PROVIDED IN MACHINE CONTROLLER OF EACH NC MACHINE TOOL

BACKGROUND OF THE INVENTION

1. Field of the Invention

This invention relates to a machining system wherein a single common master controller is used for the operational control of a plurality of numerical control (NC) machine tools. More particularly, this invention relates to a machining system wherein an operation mode selector is provided in the machine controllers of each NC machine tool and which is suitable for efficient machining of metal molds.

2. Description of the Prior Art

In general, metal molds are produced in small lots and are of complex shapes. Therefore, it is very difficult to prepare NC programs for metal mold machining, and the metal molds are, in many cases, machined with a profile machine tool. Further, since the material of workpieces used for the production of metal molds is hard and difficult to cut and the workpiece shapes are complex, the path of a tool for cutting the workpieces must be sharply changed at many points. Accordingly, the operator must watch for tool breakage, excessive cutting resistance, etc. in operating the machine tool. For these reasons, it is difficult to automate and systemize the machining of metal molds.

Recently, however, automatic units for preparing NC programs for the machining of complicated, three-dimensional, curved surfaces have been developed. Also developed have been various automatic functions, such as for changing abnormal tools detected by an automatic broken tool sensor and a tool life monitor with a spare tool; a machining condition monitor allowing under optimum machining conditions; and an automatic pallet changer for automatically changing workpieces. These developments have been placing automation of metal mold machining with NC machine tools in closer reach.

On the other hand, it has also been proposed to employ a group control system for machine tools in which a plurality of NC machine tools and a workpiece carrying line connecting these NC machine tools are operated and controlled by a single central processor in the absence of operators. This system is effective for small and medium lot production. For example, U.S. Pat. No. 3,576,540 discloses a system for operating and controlling a plurality of machine tools, a workpiece carrying line, and a tool carrying line by a single computer. U.S. Pat. No. 4,069,488 discloses a method for minimizing the processing time of the central processor in a system for controlling and monitoring many machine tools.

The conventional group control system mentioned above is designed for mass production of workpieces having a relatively simple shape and made of easy-to-machine material. Unmanned machining is relatively easy for these workpieces. Further, in this system, the central processor, the NC machine tool, and the workpiece carrying line are specially designed to suit the system. Direct application of this conventional system to metal mold machining would bring about very real problems, as described below.

Namely, in NC machining of metal molds, since the shapes of the metal molds are complicated, the NC unit must quickly receive and process many blocks of NC machining information. In the conventional system, the limited signal transferring capacity of the central processor used in the system makes it practically impossible to quickly send many blocks of NC machining information from one central processor to the NC unit of every NC machine tool without passing through machine controllers for intermediate processing. Accordingly, if the conventional system is directly used for metal mold machining, the NC machining information cannot be sent to the NC units close upon each other. As a result, the tool feed operation is interrupted during the process of metal mold machining, resulting in ridges, usually referred to as cutter marks, on the machined surface of the workpiece and a longer machining period.

Further, since the machining sequence made according to the production plan and recorded in the central processor cannot easily be changed, this system cannot quickly cope with unscheduled rush machining of workpieces with machining sequences not recorded in the processor and cannot cope with changes in production plans. Also, since the conventional system is composed of specially designed NC machine tools and workpiece carrying line, it is impossible to incorporate existing general-purpose NC machine tools into the system.

Furthermore, unlike mass production, orders are usually for production of a single metal mold. Therefore, it is economically impossible to conduct trial machining and is essential for the operator to monitor the machining condition. Thus the operator must sometimes interrupt the NC machining operation to inspect the machining condition. However, since the conventional system is designed for unmanned machining, it is difficult to obtain access to the workpiece being machined. Moreover, it is difficult for the operator to stop the operation of the machine tools of this system at a desired point of time for the purpose of inspection and then to resume the machining from the point of interruption.

SUMMARY OF THE INVENTION

The primary object of the present invention is to provide a machining system comprising an operation mode selector which allows an operator to quickly cope with a change in the condition at the production site by just manipulating the operation mode selector and without having to change the machining sequence made in advance according to the production plan and registered in a single master controller, and which is provided for each of machine controllers of NC machine tools in the system.

Another object of the present invention is to provide a machining system suitable for quickly machining metal molds to obtain good finish surface by continuously sending NC machining information from the master controller to a plurality of NC machine tools.

A further object of the present invention is to provide a machining system capable of being realized by the use of a general-purpose computer as the master controller and existing general-purpose NC machine tools as the machine tools of the system.

A still further object of the present invention is to provide a machining system capable of knowing the remaining machining time during the long period of time for achieving the metal mold machining.

A still further object of the present invention is to provide a machining system in which the operator can interrupt the machining process at an arbitrary point of time and resume the machining from an arbitrary portion of the NC machining information.

BRIEF DESCRIPTION OF DRAWINGS

The above and other objects and features of the present invention will be apparent from the ensuing description of an embodiment of the present invention with reference to the accompanying drawings, wherein.

DESCRIPTION OF THE PREFERRED EMBODIMENTS

Figure 1:
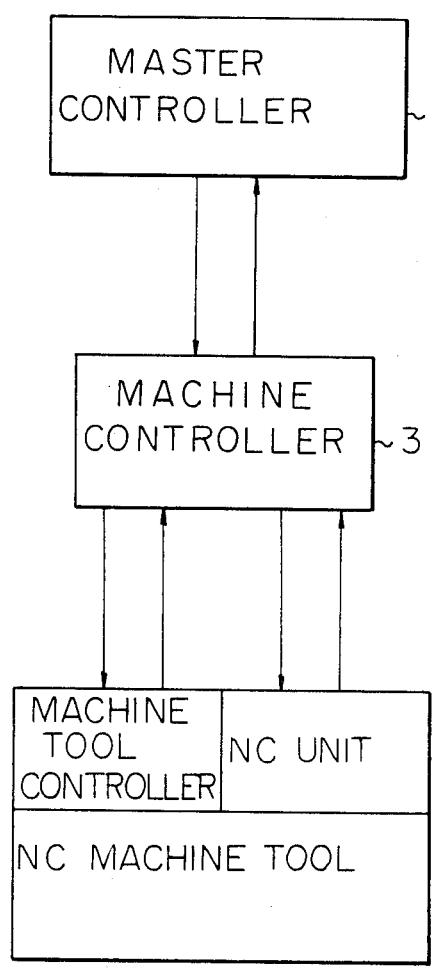
FIG. 1 is a diagrammatic block diagram of a machining system illustrating the basic principle of the present invention.

Referring to FIG. 1, a command signal sent from a master controller 1 is temporarily stored in a machine controller 3. After a request by an NC machine tool the command signal is then sent to an NC unit and a machine tool controller to operate the NC machine tool, various alarm signals from the NC unit, and the signals detected by the machine tool controller such as the workpiece code number, broken tool sensing, and tool life sensing signals are transferred to a displayer of the machine controller 3 and displayed theron. These signals are also sent to the master controller 1 and stored in a history control means therof. In the conventional group control system, for machine tools, there is no machine controller 3, i.e., the signals are directly transferred from a central processor to NC machine tools.

Figure 2:
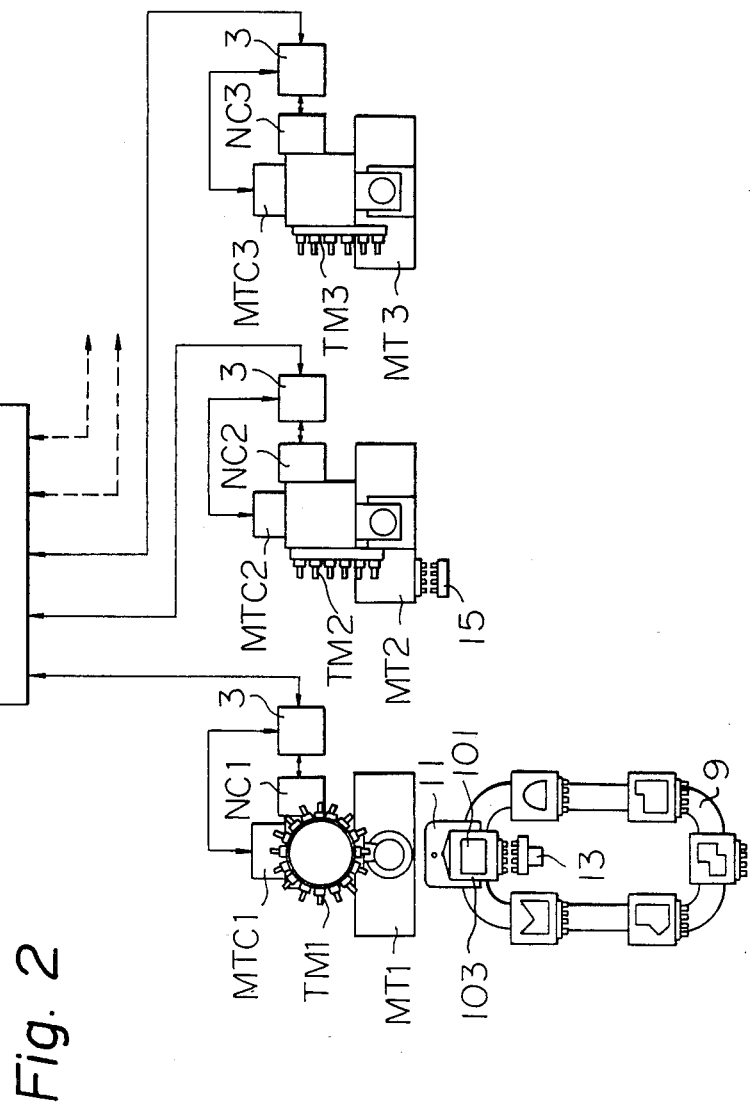
FIG. 2 is a schematic block diagram of an embodiment of a machining system in accordance with the present invention.

FIG. 2 is a schematic block diagram of an embodiment of the machining system in accordance with the present invention. The master controller 1 is connected to a plurality of NC machine tools MT1, MT2, and MT3 respectively provided with NC units NC1, NC2, and NC3 via respective machine controllers 3. These NC machine tools are provided with tool magazines TM1, TM2, and TM3, respectively, and can automatically change tools attached to their spindles. The NC machine tool MT1 is provided with an automatic pallet changer 11 capable of automatically replacing a pallet thereon with one of the pallets in a pallet magazine 9. The NC machine tool MT1 is also provided with a unit 13 for automatically reading the code number of a workpiece mounted on a fixture 103 of a pallet prior to pallet change when such pallet is indexed at a pallet changing position of the pallet magazine 9. The NC machine tool MT2 has no automatic pallet changer and is provided with a unit 15 for manually reading the workpiece code number. The NC machine tool MT3 is a general-purpose type provided with neither an automatic pallet changer nor a workpiece code number reading unit. The master controller 1 can also be connected to additional NC machine tools if necessary. The master controller 1 sends the NC machining information to the machine controllers 3, which then send the NC machining information to the NC units of the NC machine tools at a rate which the NC units can accept.

Figure 3A:
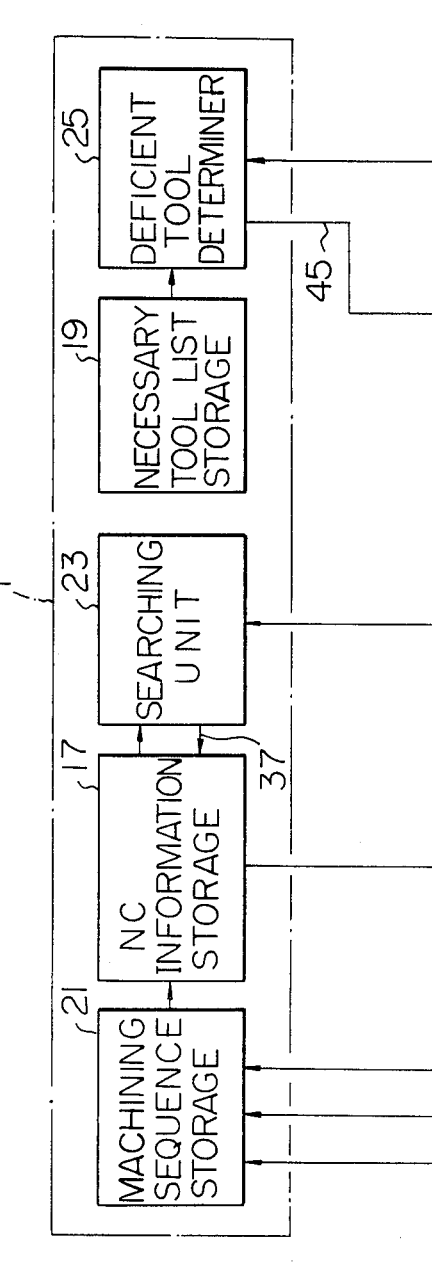
FIG. 3 is composed of FIGS. 3A and 3B which when connected together form a block diagram of a signal transferring arrangement provided among units of a master controller, a machine-control, and an NC machine tool.
Figure 3B:
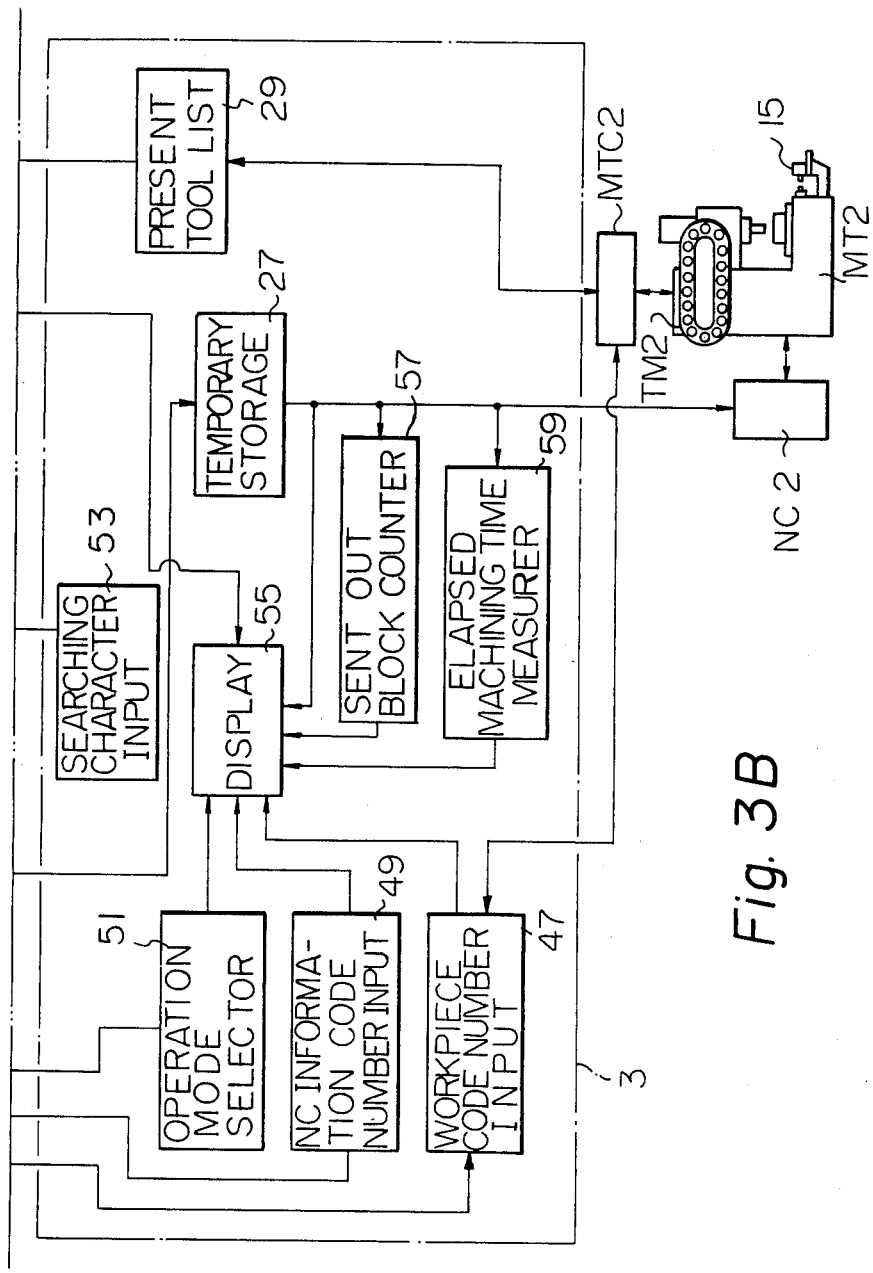

FIG. 3 is a diagram of the signal transferring arrangement provided among the constituent elements of the master controller 1, the machine controllers 3, and the NC machine tools. For clarity, only the connections among the master controller 1, the NC machine tool MT2 in FIG. 2 and its associated machine controller 3 are shown. Signals can be transferred in the same way among the component elements of the other machine controllers 3, NC machine tools MT1, MT3, or the like. FIGS. 4 through 8 are schematic diagrams of an NC machining information storage unit 17, a necessary tool list storage unit 19, a machining sequence storage unit 21, a searching unit 23 for searching for an arbitrary portion of the NC machining information, and a deficient tool determines 25 of the master controller 1. FIG. 9 is a diagrammatic view of a temporary storage unit 27 of the machine controller 3.

Figure 4:
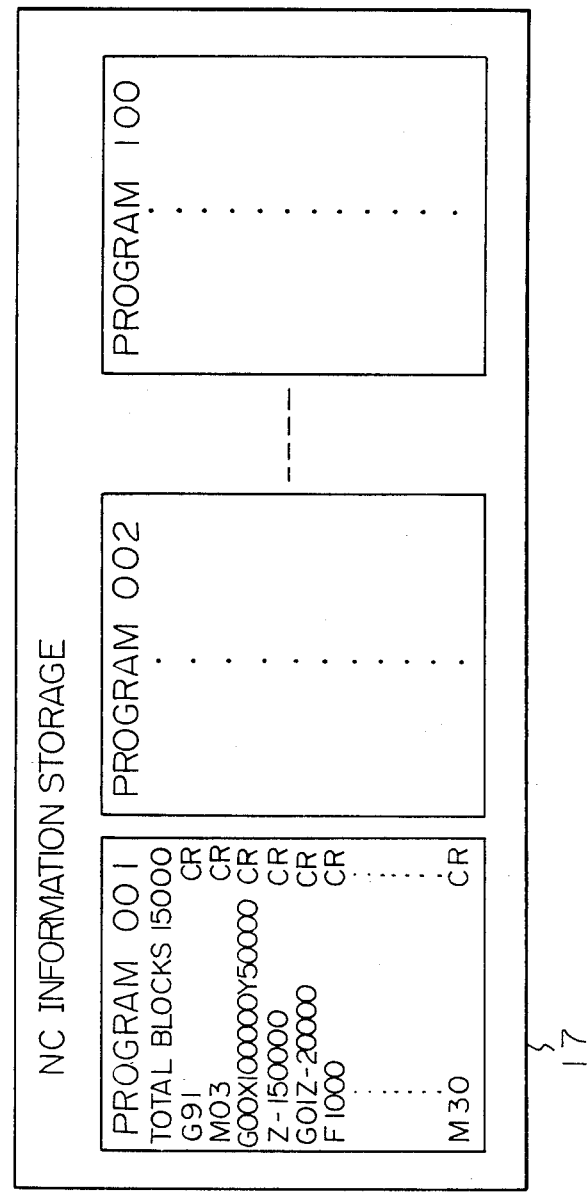
FIG. 4 is a diagrammatic view of an NC machining information storage unit.
Figure 5:
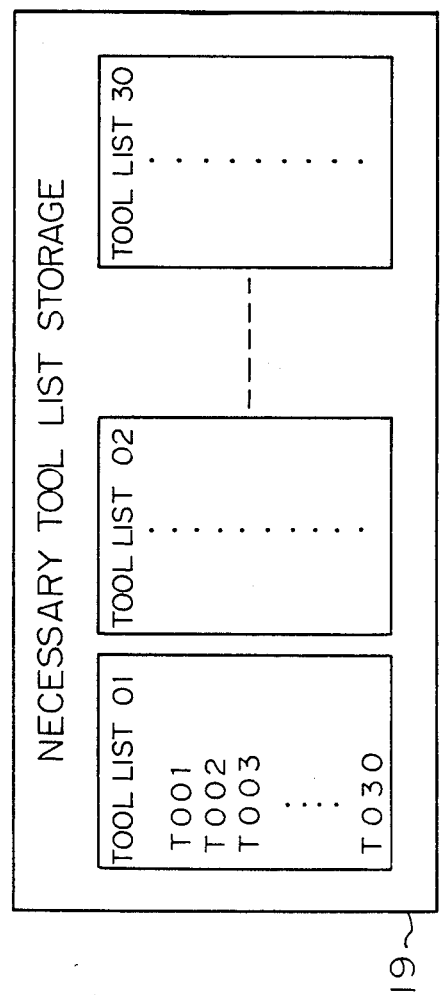
FIG. 5 is a diagrammatic view of a necessary tool list storage unit.
Figure 6:
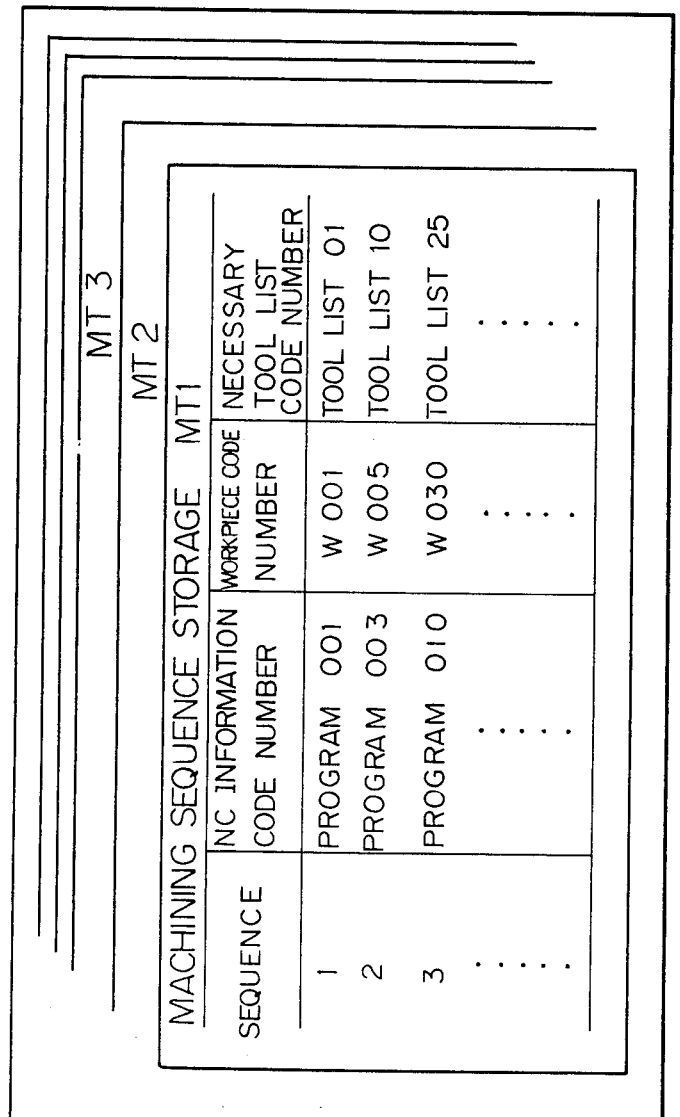
FIG. 6 is a diagrammatic view of a machining sequence storage unit.

The master controller 1 includes the NC machining information storage unit 17, the necessary tool list storage unit 19, the machining sequence storage unit 21, the searching unit 23 for looking up an arbitrary portion of the NC machining information and the deficient tool determiner 25. The NC machining information storage unit 17 stores 100 kinds of NC machining information, provided with the code numbers PROGRAM 001 to PROGRAM 100. Each kind of NC machining information corresponding to each NC machining information code number is constituted by a number of information blocks, the total number of which is written ahead of the actual content of the NC machining information. The total number of blocks of the NC machining information of the code number PROGRAM 001 is 15,000 blocks as shown in FIG. 4. One block includes a unit of NC machining information. The NC unit receives the blocks of the NC machining information one by one to calculate the tool path and control the movement of the NC machine tool. For example, in FIG. 4, G91CR and G00X100000Y50000CR each designates one block. The necessary tool list storage unit 19 stores 30 kinds of necessary tool lists provided with the code numbers TOOL LIST 01 to TOOL LIST 30. For example, TOOL LIST 01 lists 30 tools having the code numbers T001 to T030. The machining sequence storage unit 21 stores, in advance, the correspondence among the machining sequence for each NC machine tool, the code number of the NC machining information, the workpiece code number, and the code number of the necessary tool list according to the production plan. For example, the machining sequence storage unit 21 stores the machining sequence of the NC machine tool MT1 in which the workpiece having the workpiece code number W001 is first machined with the tool registered in the necessary tool list code number TOOL LIST 01 according to the NC machining information of the NC machining information code number PROGRAM 001. Then, the workpiece having the workpiece code number W005 is machined with the tool registered in the necessary tool list code number TOOL LIST 10 according to the NC machining information of the NC machining information code number PROGRAM 003. Even for a workpiece with a machining sequence which has not been determined, it is possible to store only the correspondence among the corresponding NC machining information code number, the necessary tool list code number, and the workpiece code number without determining the machining sequence.

The searching unit 23 (FIG. 7) for looking up an arbitrary portion of the NC machining information consists of a searching character register 31 for reading and temporarily storing the character string sent from a searching character input 53 described later, an NC machining information register 33 which sequentially reads the contents of the NC machining information corresponding to the NC machining information code number from the NC machining information storage unit 17, and a comparator 35 for comparing each content of the searching character register 31 with each content of the NC machining information register 33 generating a coincidence signal 37 when the compared contents coincide with one another. When the coincidence signal 37 is generated, the portion where the character to be looked up is specified in the aforesaid NC machining information. The deficient tool determiner 25 (FIG. 8) consists of a necessary tool register 39 for reading the contents of the corresponding necessary tool list from the necessary tool list storage unit 19, a present tool register 41 for reading the contents of the present tool list sent from a present tool list 29 which will be described later, and a comparator 43 for comparing the contents of the necessary tool register 39 with the contents of the present tool register 41 and discriminating deficient tools. The comparator 43 generates deficient tool number signals 45 for indicating the tool numbers regarded as the deficient tools, and holds the sending of the next signal from the master controller 1 to the machine controller 3.

In the above-described embodiment, the machine controller 3 includes (FIG. 3B) includes a tempoary storage unit 27, the present tool list 29, a workpiece code input unit 47, an NC machining information code number input unit 49, an operation mode selector 51, searching character input unit 53, a displayer 55, a counter 57 for counting the number of blocks the data of which has been sent out, and an elapsed machining time measurer 59. The temporary storage unit 27 (FIG. 9) consists of a ring buffer 61 having a capacity of storing a plurality of temporary storage units A at a time. In this embodiment, the NC machining information is divided into the temporary storage units A, each comprising 256 characters, and originally 768 characters (three temporary storage units A) sent from the master controller 1 (FIG. 1) are temporarily stored in the ring buffer 61 having the capacity of storing 1,000 characters. The ring buffer 61 can send the blocks of the NC machining information one by one immediately after receiving the information. After 24 characters have been sent out, the next temporary storage unit A (256 characters) can be received since a blank portion 63 in the ring buffer 61 increases from the capacity of 232 characters to that of 256 characters. In addition to constituting the temporary storage means 27 by the ring buffer 61, it is also possible to constitute the temporary storage unit 27 by the use of a plurality of buffers. For example, it is possible to employ three buffers, each capable of storing a single temporary storage unit comprising 1,000 characters. The temporary storage unit 27 receives and temporarily stores much NC machining information at a time, and sends out the blocks of the NC machining information one by one at a rate suitable for the NC unit to receive the blocks, thereby making it possible to conduct calculation of the tool path without halting the operation of the NC unit. The present tool list 29 is a memory unit for storing the tool numbers of usable tools in the tools presently possessed by the machine tool (MT2 in this embodiment) that the machine controller 3 controls. When machining is initially started, all tools loaded on the tool magazine TM2 of the NC machine tool MT2 are stored in the present tool list 29. When a given tool of all loaded tools is regarded as unusable by the tool broken sensor and the tool life monitor of the NC machine tool MT2 during the use of the given tool, the corresponding tool number is erased, and only the usable tools' numbers are always stored in the present tool list 29.

The workpiece code number input 47 sends the code number of a workpiece mounted on the NC machine tool MT2 to the machining sequence storage unit 21 of the master controller 1. The workpiece code number read out by the automatic workpiece code number reading unit 13 (FIG. 10) or the manual workpiece code number reading unit 15 (FIG. 11) is also sent to the machining sequence storage unit 21 via the workpiece code number input 47. In the NC machine tool MT3 provided with no workpiece code number reading unit, the code number of a workpiece mounted is directly keyed in from the workpiece code number input 47. The NC machining information code number input 49 is used to register the machining sequence in the machining sequence storage unit 21 or to inform the code number of the NC machining information desired to receive to the master controller 1.

In the embodiment described above, the operation mode selector 51 consists of a switch for selecting an operation mode from the four modes. In the first operation mode, the command from the master controller 1 is interrupted, and the NC machine tool MT2 is independently operated by the use of an NC tape loaded on the NC unit NC2 of the NC machine tool MT2. In the second operation mode, the NC machining information corresponding to the workpiece code number inputted by the workpiece code number input 47 is searched and taken out of the machining sequence storage unit 21 and sent from the master controller 1 to the NC unit NC2 via the machine controller 3 to operate the NC machine tool MT2. In the third operation mode, the NC machining information is sent from the master controller 1 to the NC unit NC2 via the machine controller 3 according to the sequence registered in the machining sequence storage unit 21, thereby performing operation of the NC machine tool MT2. In the fourth operation mode, the NC machining information corresponding to the code number inputted by the NC machining information code number input 49 is sent from the master controller 1 to the NC unit NC2 via the machine controller 3 each time the code number is inputted, thereby operating the NC machine tool MT2. The searching character input 53 cooperates with the searching unit 23 for looking up an arbitrary portion of the NC machining information. For example, in order to interrupt machining because of abnormal condition of the machined surface and then to restart the operation after replacing the tool with a new one, it is necessary to look up the start point in machining with the replaced tool from the NC machining information and to send the NC machining information after that point from the master controller 1. At this time, the searching character input 53 indicates the character string of the NC machining information to be looked up by the searching unit 23 for looking up an arbitrary portion of the NC machining information. Any character string of specific information among the long NC machining information, for example, the tool number, the spindle speed, or the like, can be the searching character.

In the embodiment described above, the displayer 55 consists of a cathode ray tube (CRT), which sequentially displays the contents of the NC machining information sent from the temporary storage unit 27 to the NC unit, and displays the code number of a workpiece inputted by the workpiece code number input 47, the code number of the NC machining information inputted by the NC machining information code number input 49, the operation mode selected by the operation mode selector 51, and the code number of the deficient tool outputted from the deficient tool determiner 25.

The counter 57 for counting the number of blocks whose data has been sent out counts the blocks of the NC machining information sent from the temporary storage unit 27 to the NC unit NC2 and sequentially outputs the counting results to the displayer 55. The elapsed machining time measurer 59 starts measuring the time when the NC machining information begins to be sent from the temporary storage unit 27 to the NC unit NC2 and sequentially outputs the measuring results to the displayer 55. The measurer 59 stops the measurement upon receiving the signal indicating the completion of the transfer of the NC machining information from the temporary storage unit 27 to the NC unit NC2. By always displaying on the displayer 55 the total number of blocks among the contents of the NC machining information sent from the temporary storage unit 27 to the NC unit NC2, in addition to the aforesaid number of blocks whose data has been sent out and the elapsed machining time, it is possible to know the time required to complete the machining of the workpiece, i.e., the remaining machining time. For example, when the displayed total block number is 15,000, the displayed number of blocks sent out is 5,000, and the elapsed machining time displayed is 40 minutes, it is possible to understand that two times the elapsed machining time (40 minutes), i.e., 80 minutes, are required to operate the remaining 10,000 blocks insofar as the number of blocks sent out is approximately proportional to the elapsed machining time. The total of all the above-mentioned units for displaying the total block number, counting and displaying the number of blocks sent out, and measuring and displaying the elapsed machining time will be hereinafter referred to as a remaining machining amount displaying means. It is, of course, possible to automatically conduct the proportional calculation and display only the remaining machining time.

Alternatively, the remaining machining amount displaying means may be constructed as described below. Namely, when the NC machining information is made, the total machining time involving each feed axis movement time calculated from each feed axis movement distance and speed, the entire tool change time, the entire indexing time of the rotary work table, and the like are calculated in advance and inputted to the beginning of the NC machining information. Further, a time measuring means for starting time measurement upon receiving a signal indicating the start of sending of the NC machining information from the temporary storage unit 27 to, for example, the NC unit NC2 is provided. In this remaining machining amount displaying means, the total machining time is read from the NC machining information and the time measured by the above-mentioned time measuring means is sequentially subtracted from the total machining time, and the result is displayed on the displayer 55 (FIG. 3).

Figure 10:
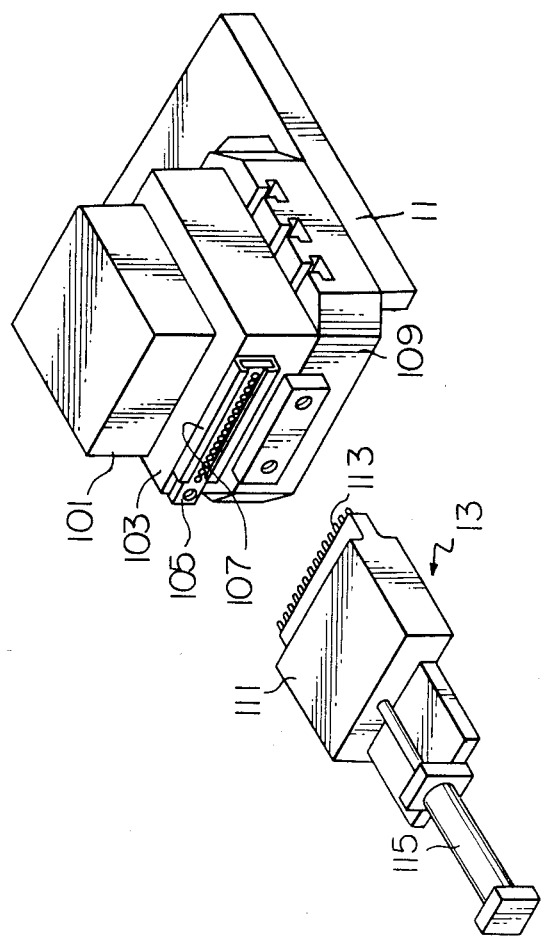
FIG. 10 is a perspective view of an automatic workpiece code number reading unit.
Figure 11:
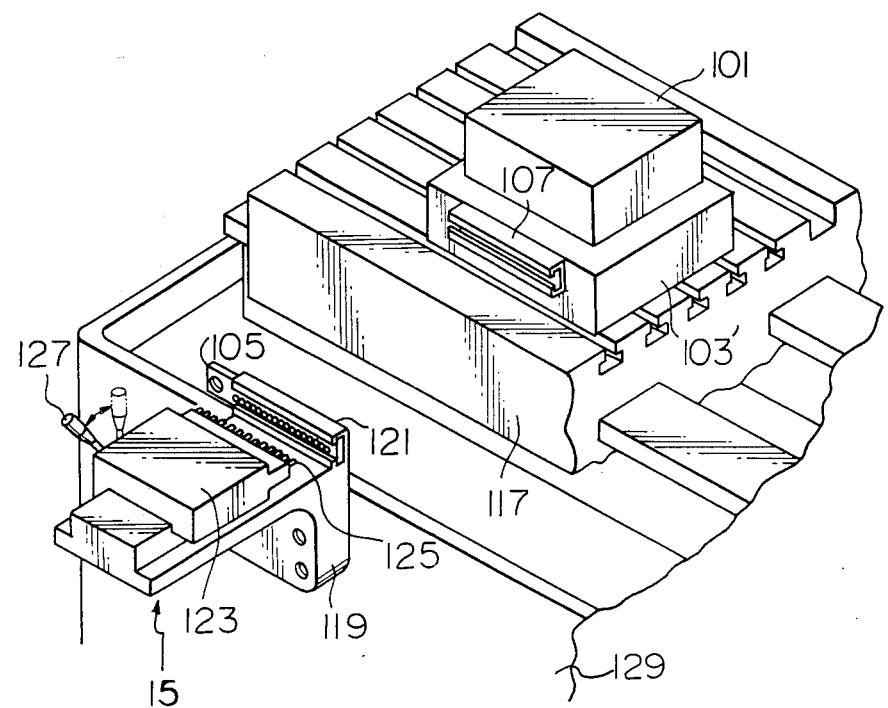
FIG. 11 is a fragmentary perspective of a manual workpiece code number reading unit.

The compositions of the automatic workpiece code number reading unit 13 (FIG. 2) and the manual workpiece code number reading unit 15 (FIG. 2) employed in the embodiment described above will now be described in detail with reference to FIGS. 10 and 11. The automatic workpiece code number reading unit 13 is positioned adjacent to the NC machine tool MT1 (FIG. 2) provided with the automatic pallet changer 11, and automatically reads out the code number of a workpiece prior to the pallet change with respect to the NC machine tool MT1 at the pallet changing position of the pallet magazine 9. A workpiece 101 is mounted on a workpiece mounting fixture 103, which is provided with a plate receiver 107 for releasably fitting a coding dog plate 105 for a given workpiece code number. The workpiece mounting fixture 103 is mounted on a pallet 109. On the other hand, a movable code sensor 111 is arranged for detecting the dog presence pattern of the coding dog plate 105 when the pallet 109 is indexed at the pallet changing position. For example, the code sensor 111 may be constituted by a 16-limit switch unit 113 and can detect the 16 dog presence patterns when the limit switch unit 113 is pressed against the dogs of the coding dog plate 105 by an air cylinder 115.

The manual workpiece code number reading unit 15 is positioned adjacent to the NC machine tool MT2 (FIG. 2) provided with no automatic pallet changer and is used to read out a workpiece code number by manual operation of the operator. A workpiece 101 is mounted on a workpiece mounting fixture 103′, (See FIG. 11) which is provided with the plate receiver 107 for releasably fitting a coding dog plate 105 for a given workpiece code number. The workpiece mounting fixture 103′ is mounted on a table 117 of the NC machine tool MT2. Further, a code sensor mounting base 119 is positioned, for example, in front of a bed 129 of the NC machine tool MT2. The code sensor mounting base 119 comprises an insertion port 121 for the coding dog plate 105, and a code sensor 123 which is contacted with the coding dog plate 105 when the coding dog plate 105 is inserted into the insertion port 121, thereby detecting the dog presence pattern of the plate 105. The code sensor 123 may be constituted by a 16-limit switch unit 125 and can detect the dog presence pattern of the coding dog plate 105 when pressed against the coding dog plate 105 by a lever 127 after the coding dog plate 105 is shifted from the plate receiver 107 of the workpiece mounting fixture 103′ on the table 117 to the insertion port 121 of the code sensor mounting base 119.

Referring again to FIGS. 2 and 3, each machine controller 3 may be integrally incorporated in the console of the NC unit of each corresponding NC machine tool MT1, MT2 or MT3. Further, the temporary storage unit 27 and the displayer 55 of each machine controller 3 may respectively be used also as the temporary storage unit and the displaying unit of the NC unit. It is also possible to use a CPU for operating various means such as the operation mode selector 51 of the machine controller 3 also as the CPU provided in the NC unit for conducting the interpolation calculation and the like.

Figure 12B:
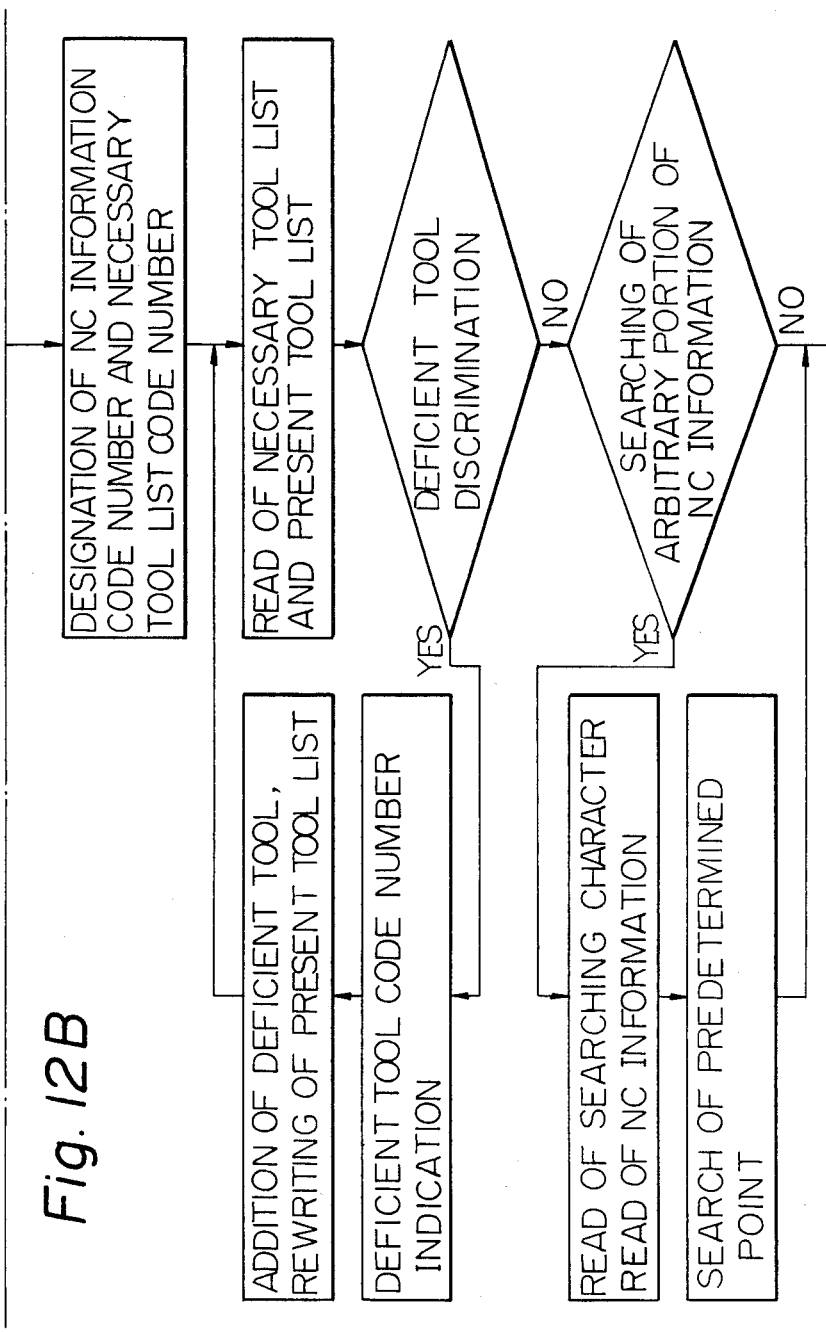
FIG. 12 is composed of FIGS. 12A, 12B and 12C and which when connected together as shown is an operation sequence diagram of the machining system of the present invention.

The signal transferring and the operation sequence of the machining system will now be described with reference to FIGS. 2, 3, and 12. Before the machining of all NC machine tools MT1, MT2, and MT3 is started, predetermined tools are loaded on the tool magazines TM1, TM2, and TM3 of the NC machine tools, and the code numbers of the tools are stored in the present tool lists 29 of respective machine controllers 3. Further, preselected workpieces 101 are mounted on the pallet magazines 9 or on the mounting fixture 103'.

The coding dog plates 105 are subsequently fitted to the workpiece mounting fixtures 103 and 103'.

In the machining sequence storage unit 21 of the master controller 1 are stored the machining sequence determined according to the production plan, the code number of the NC machining information, the code number of the necessary tool list paired to the code number of the NC machining information, and the workpiece code numbers. These pieces of data can be inputted from the NC machining information code number inputs 49 and the workpiece code number inputs 47 of respective machine controllers 3, or from the terminal unit (not shown) which the master controller 1 possesses. On the other hand, each NC machining information is created with the automatic programming unit or the like and inputted in advance in the NC machining information storage unit 17 of the master controller 1. At the head of each NC machining information, the code number thereof and the total block number or the total machining time are inputted in advance. A necessary tool list is registered in the necessary tool list storage unit 19 of the master controller 1.

After these preparations are finished, the machining start switches of the machine controllers 3 are turned on. With this operation, the respective operation modes selected are first discriminated with respect to all NC machine tools MT1, MT2, and MT3. One of the first to fourth operation modes is displayed on the displayer 55 of each machine controller 3. When the first operation mode is selected, an NC tape is loaded on the corresponding NC unit or units, and the corresponding NC machine tool or machine tools is independently operated by the operator. In this case, no NC machining information is sent from the master controller 1.

When the second operation mode is selected, the air cylinder 115 of the automatic workpiece code number reading unit 13 is activated, and the code sensor 111 moves forward to contact the coding dog plate and automatically read the workpiece code number in the case of the NC machine tool MT1. In the case of the NC machine tool MT2, the operator changes the position of the coding dog plate 105 from the workpiece mounting fixture 103' to the code sensor mounting base and contacts the code sensor 123 with the coding dog plate 105 by operating the lever 127 to read the workpiece code number by use of the manual workpiece code number reading unit 15. In the case of the NC machine tool MT3 having no workpiece code number reading unit, the workpiece code number is directly keyed in from the workpiece code number input 47 of the corresponding machine controller 3 by the operator. The signals of the workpiece code numbers are transmitted to the machining sequence storage unit 21 of the master controller 1. Then, the machining sequence storage unit 21 designates the code numbers of the NC machining information and the necessary tool lists corresponding to the workpiece code numbers.

In case the third operation mode is selected, the NC machining information code number and the necessary tool list code number in the first step in the machining sequence stored in the machining sequence storage unit 21 are designated.

In case the fourth operation mode is selected, the operator inputs the NC machining information code number by use of the NC machining information code number input 49, and at the same time the code number of the necessary tool list corresponding to the NC machining information code number is designated by the machining sequence storage unit 21.

Figure 8:
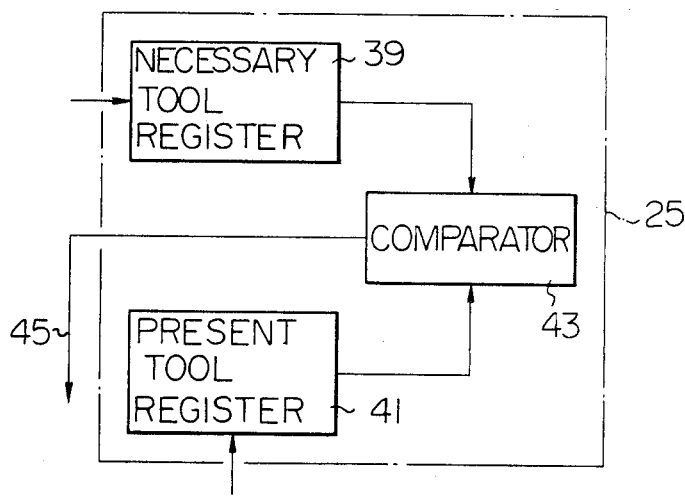
FIG. 8 is a schematic block diagram of a deficient tool determining unit.
Figure 9:
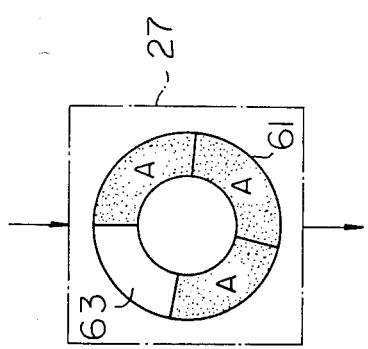
FIG. 9 is a diagrammatic view of a temporary storage unit.

In this way, the code numbers of the necessary tool lists are designated according to the second to fourth operation modes and the necessary tool lists are read from the necessary tool list storage unit 19 by the necessary tool register 39 (FIG. 8). At the same time, the present tool list is written into the present tool list register 41 (FIG. 8). The lists written in these registers 39 and 41 are compared with each other by the comparator 43 (FIG. 8) to determine whether or not any tools are deficient.

Figure 7:
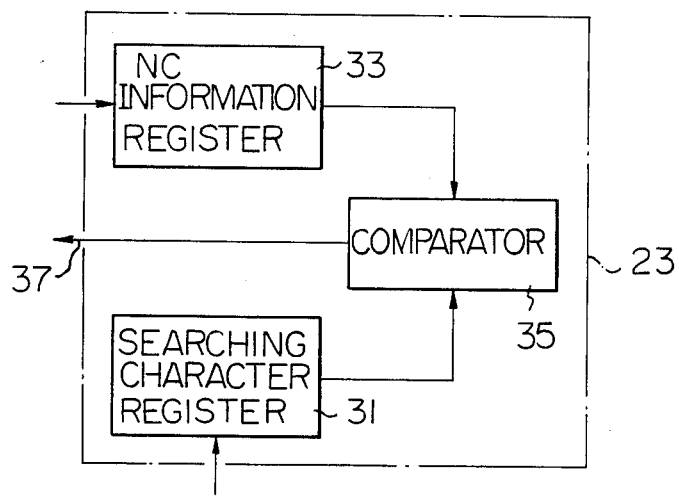
FIG. 7 is a schematic block diagram of a searching unit for an arbitrary portion of the NC machining information.

When a tool or tools is deficient, the corresponding tool number or numbers is indicated on the displayer 55. In this case, the operator supplies the tools to the NC machine tool, and at the same time renews the contents of the present tool list 29. Then, the deficient tool discrimination is again conducted and, if there are all necessary tools, the NC machining information corresponding to the NC machining information code number designated by the machining sequence storage unit 21 is sent to the temporary storage units 27 in an amount of 256 characters at a time. At this time, existence of the request for looking up an arbitrary portion of the NC machining information is discriminated. If there is such request, the character string to be looked up, which is inputted by the searching character input 53, is read into the searching character register 31 (FIG. 7). Further, the NC machining information is sequentially read into the NC machining information register 33 (FIG. 7). In this way, searching operation is continued until the coincidence signal 37 is generated from the comparator 35 (FIG. 7). When the point containing the looked up character is specified in the NC machining information by the coincidence signal 37, the NC machining information after the specified point is sent to the temporary storage units 27 in units of 256 characters.

Each time a request is made by the NC units, the temporary storage units 27 send the blocks of this NC machining information one by one to the NC units, to start the operation of the NC machine tools. At this time, the total block number inputted at the head of the NC machining information is indicated on the displayers 55. In addition, the elapsed machining time measurers 59 start to measure the elapsed machining time, and the measurement result is displayed on the displayers 55. Further, the blocks of the NC machining information sent to the NC units are indicated one by one on the displayers 55.

Each time one block of the NC machining information is sent to the respective NC units, the counters 57 increase their counts by one, and the counting results are sequentially indicated on the corresponding displayers 55. In this way, all NC machining information is sent out, and machining is completed.

Communication of the signals among elements as shown in FIG. 3 is performed via the input/output devices provided in the master controller 1 and the machine controllers 3. In general, the master controller 1 is positioned at a location separated from the NC machine tools in the machining factory. On the other hand, the machine controllers 3 are generally located in the vicinity of respective NC machine tools, where they can be operated easily. Accordingly, the master controller 1 is far apart from the machine controllers 3, so that there is a risk of noise developing in the signal transfer lines. The risk increases particularly when NC electric discharge machines are used as the NC machine tools. To prevent noise, it is preferable to employ an optical fiber for the communication between the master controller 1 and the machine controllers 3. In the embodiment described above, the NC machining information is sent from the machine controllers 3 to the corresponding NC units via a timing circuit (not shown) for converting the signal to a form which the NC units can accept. In the aforesaid embodiment, the unit 23 for looking up an arbitrary point of the NC machining information is incorporated as one component element of the master controller 1. However, it is also possible to incorporate the unit 23 as a component element of each machine controller 3. Namely, a register for reading the NC machining information temporarily stored in the temporary storage unit 27, a searching character register, and a comparator for comparing the contents of these two registers may be arranged in each machine controller 3.

Further, in the above-described embodiment, the workpiece code number inputs 47, the NC machining information code number inputs 49, operation mode selectors 51, and the like are operated by the conversational method by use of a combination of the displayers 55 and the software keys. Therefore, these component elements can be operated very easily even by an operator not skilled in the machining system.

The technical effects of the machining system in accordance with the present invention will now be described below. Normally, the machining system is operated in the third operation mode by registering the machining schedule for each NC machine tool MT1, MT2, or MT3 in the machining sequence storage unit 21 according to the production plan. In this case, the NC machine tool MT1 provided with the pallet magazine 9 can perform unmanned machining by automatically looking up the corresponding workpieces by the automatic workpiece code number reading unit 13. In the NC machine tool MT2 or MT3 provided with no pallet magazine, since the code number of the workpiece to be machined is indicated on the displayer 55 of the machine controller 3, the corresponding workpiece is mounted on the table 117 of the NC machine tool MT2 or MT3 by the operator. The second operation mode is used to ignore the machining sequence determined according to the production plan, and preferentially machine the workpiece that is mounted on the NC machine tool. In the NC machine tool MT1 provided with the automatic pallet changer, machining is performed in the sequence of the workpieces mounted on the pallet magazine 9. This second operation mode is used when the production plan cannot be made, when workpieces cannot be procured as scheduled according to the production plan, and the like. The second operation mode makes it possible to quickly cope with a change in the production without changing the sequence stored in the machining sequence storage unit 21 of the master controller 1. The fourth operation mode is used when a workpiece not included in the production plan is to be machined urgently, when trial machining is to be conducted, and the like. The fourth operation mode is also advantageous since it makes it possible to quickly cope with a change in production without changing the sequence stored in the machining sequence storage unit 21. The first operation mode is used in an emergency, for example, when a failure occurs with the master controller 1, when communication between the master controller 1 and the machine controllers 3 becomes impossible, and the like. The first operation mode is useful to prevent machining in the machining system from completely stopping due to such a failure. As described above, the system can quickly and adequately cope with any change in production condition by virtue of the operation mode selector 51 of each machine controller 3.

In the above-described embodiment, the temporary storage unit 27 of the machine controller 3 is constituted by the ring buffer 61 which receives the NC machining information from the master controller 1 at a rate of, for example, one millisecond/character and temporarily stores it. Namely, it takes about one second for the ring buffer 61 to temporarily store the 1,000-character information, which is the maximum capacity thereof. On the other hand, the maximum NC machining information acceptance rate of the NC unit is 3.3 milliseconds/character. Further, a long period is required for the next one-block information to be accepted after one-block NC information normally comprising several scores of characters are calculated and the machine tool is operated. Accordingly, after the master controller 1 once sends the NC machining information to the temporary storage unit 27 of one machine controller 3 and the ring buffer 61 is filled up, the master controller 1 can have a time margin for sending another piece of NC machining information to the temporary storage unit of another machine controller 3. Approximately before the number of characters stored in the ring buffer 61 of the temporary storage unit 27 to which data was first sent reduces to 330 characters, NC machining information is filled in the temporary storage units of all other machine controllers 3, and therefore the master controller 1 can again send NC machining information to the first temporary storage unit 27. For example, assuming that the temporary storage unit 27 is constituted by one buffer capable of storing a single temporary storage unit consisting of 1,000 characters, the temporary storage unit 27 can temporarily store new NC machining information only after all of 1,000 characters have been sent out to the NC unit. Accordingly, when sending of all information has been finished and the next information must be sent out immediately to the NC unit, sending of information to the NC unit becomes possible only after 1,000-character NC machining information is temporarily stored in the buffer from the master controller 1 over about one second. However, this is not preferable since the NC machine tool is in such a condition that the tool is rotating but the feeding operation is stopped for this period of about one second, resulting in ridges called cutter marks on the machined surface. Further, the time required for the machining to be completed becomes unnecessarily long. Accordingly, in the present invention, the ring buffer 61 capable of accepting a plurality of temporary storage units A and the temporary storage unit 27 having a plurality of buffers are employed to eliminate ridges on the machined surface of the workpiece and the feed halting time during machining. This improves the machining accuracy and allows efficient metal mold machining.

The remaining machining amount displaying means of the machine controller 3 makes it possible to know the remaining time of the presently performed machining. Particularly, in the NC machine tools MT2 and MT3 provided with no automatic pallet changer, this remaining machining amount displaying means allows the operator to make the plan of the next setup and perform efficient workpiece change operation. Thus, by positioning the machine controller 3 at a place where the operator of the machine tool between the master controller 1 and each NC machine tool can directly operate the machine controller 3, it becomes possible to sequentially grasp the condition of each machine tool by the displayer, and to quickly cope with a change in schedule, an abnormality of the tool, and the like by the selection of the operation mode. In some cases, it is also possible to change the contents of the NC machining information storage unit 21 from the machine controller 3. Further, by using the machine controller 3, it rs possible to incorporate any machine tool into the machining system and operate it, regardless of whether the machine tool is provided with the automatic pallet changer or not, and regardless of whether the machine tool is provided with the automatic workpiece code reading unit 13 and the manual workpiece code reading unit 15 or not.

Further, the machine controller 3 makes it possible to use a general-purpose computer as the master controller 1 and to use a machine tool provided with a general-purpose NC unit as the NC machine tool. Therefore, when building up the machining system, it is necessary to specially design and manufacture the master controller 1, the NC unit, the machine tool, the workpiece carrying unit, and the like.

Further, the unit 23 for looking up an arbitrary portion of the NC machining information, which is provided in the master controller 1, eliminates the necessity of performing the inefficient work in which the NC machining information for a metal mold generally requiring many blocks is sent to the NC unit from the beginning, idle feeding of the NC machine tool is conducted, the completion of the idle feeding up to the predetermined position is judged by the operator based on the machine movement, and the operation is changed to the actual cutting operation. Further, the deficient tool determiner 25 makes it possible to automate the tool control. Moreover, by integrally incorporating the machine controller 3 and the NC unit in one console, it becomes possible to make the metal mold machining system compact. It is also possible to reduce the cost of the system by using the temporary storage unit, the displayer and CPU of the NC unit commonly to those of the machine controller.

We claim:

1. A machining system for machining of workpieces by employment of a plurality of NC machine tools, each of said NC machine tools being located at a machining site and being provided with and associated with an NC unit for calculating a tool path based on NC machining information and controlling movement of the associated machine tool, comprising:

a single master controller for originally storing NC programs including means for storing the NC machining information for all said NC machine tools and commanding operation of each of said NC machine tools by sending said NC machining information to said NC machine tools;

a workpiece-code-number reading means for reading and outputting code numbers of said workpieces to be machined by said plurality of NC machine tools; and a machine controller for each said NC machine tools and associated therewith positioned between said master controller and each of said NC machine tools for receiving said NC machining information from said master controller and sending out in a form suited for being inputted to each said NC machine tool;

each said NC unit associated with each said machine tool solely receives said NC machining information one by one from said machine controller associated with said NC unit and said machine tool, from the NC machinery information temporarily stored in said associated machine controller;

said master controller including:

at least an NC machining information storage unit for storing correspondence between said code numbers of said workpieces and code numbers of said NC machining information for machining said workpieces, and a number of kinds of NC machining information used for controlling the NC machining implemented by said plurality of NC machine tools, and a machining sequence storage means into which the code numbers of said NC machining information are inputted in advance and in which the machining sequences of each said NC machine tool are registered;

said machine controller provided between said master controller and each of said NC machine tools including at least:

temporary storage means capable of temporarily storing a plurality of units of said NC machining information sent from said master controller, each said unit containing therein a predetermined amount of NC machining information, so that said temporary storage means receives a large amount of NC machining information at a time from said master controller, and including means for gradually sending out said NC machining information one by one to the NC unit of said associated NC machine tool and for synchronizing the NC machining information to and with the NC machine tools at a rate capable of being inputted to each said NC machine tool; and operation mode selecting means located at said machining site and capable of selecting an operation mode from a plurality of operation modes, including:

a first operation mode in which said NC machining information from said master controller is interrupted and each said NC machine tool is operated independently from said master controller by an associated NC unit of each said NC machine tool, a second operation mode in which the code number of said NC machining information corresponding to the workpiece code number of each said NC machine tool read out by said workpiece code number reading means is searched and taken out of said storage means of said master controller by said machining sequence storage means and the NC machining information of the searched code number is sent from said master controller, and a third operation mode in which said NC machining information is sent out from said master controller in the machining sequences registered in said machining sequence storage means; and display means for indicating said workpiece code number read out by said workpiece code number reading means, said code number of the NC machining information registered by said machining sequence storage means, and the contents of the NC machining information sent from said master controller.

2. A machining system according to claim 1, wherein said machine controller further comprises a remaining machining amount displaying means for displaying a remaining machining amount determined on the basis of an overall machining amount of said NC machining information corresponding to the NC machining information code number received from said master controller, and a processed machining amount already processed by each said NC machine tool according to said NC machining information.

3. A machining system according to claim 1, wherein said machine controller is incorporated in one console integrally with said NC unit of said associated NC machine tool.

4. A machining system according to claim 1, wherein said master controller further compirses means for searching said NC machining information, so as to detect a desired portion of the NC machining information corresponding to said code number of the NC machining information stored in said master controller and means for sending the NC machining information after said desired portion to said machine controller; and a deficient tool determining means for a tool or tools deficient in said NC machine tool by comparing a present tool list which each said NC machine tool possesses with a list of necessary tools used in machining with the NC machining information sent out by said master controller.

5. A machining system according to claim 4, wherein said machine controller further comprises a remaining machining amount displaying means for displaying a remaining machining amount determined n the basis of an overall machining amount of said NC machining information correspnding to the NC machining information code number received from said master controller, and a processed machining amount already processed by each said NC machine tool according to said NC machining information.

6. A machining system according to claim 4, wherein said machine controller is incorporated in one console integrally with said NC unit of said associated NC machine tool.

7. A machining system according to claim 1, wherein the single master controller is positioned at a location separated from said NC machine tools.

8. A machining system according to claim 1, wherein each said NC machine tool includes a machine tool (MT), a tool magazine (TM) and a machine tool controller (MTC) intermediately arranged between said single master controller and said respective associated NC machine tool.

9. A machining system according to claim 5, wherein said machine controller is incorporated in one console integrally with said NC unit of said associaed NC machine tool.

10. A machinery system according to claim 1, wherein the operation mode selector consists of a switch for selecting one of the four modes of operation.

11. A machining system for machining of workpieces by employment of a plurality of NC machine tools, each of said NC machine tools being provided with an NC unit for calculating a tool path based on NC machining information and controlling movement of the associated machine tool, comprising:

a single master controller for originally storing NC programs including means for storing the NC machining information for all said NC machine tools and commanding operation of each of said NC machine tools by sending said NC machining information to said NC machine tools;

a workpiece-code-number reading means for reading and outputting code numbers of said workpieces to be machined by said plurality of NC machine tools; and a machine controller for each said NC machine tools positioned between said master controller and each of said NC machine tools for receiving said NC machining information from said master controller and sending out in a form suited for being inputted to each said NC machine tool;

each of said NC machine tools being associated with its own said NC unit, and each said NC unit is associated with its own said machine controller for receiving each block of NC information one by one from said associated machine controller;

said master controller including:

at least a storage means for storing correspondence between said code numbers of said workpieces and code numbers of said NC machining information for machining said workpieces, and a machining sequence storage means into which the code numbers of said NC machining information are inputted in advance and in which the machining sequences of each said NC machine tool are registered;

said machine controller provided between said master controller and each of said NC machine tools including at least:

temporary storage means capable of temporarily storing a plurality of units of said NC machining information, each said unit containing therein a predetermined amount of NC machining information, so that said temporary storage means receives a large amount of NC machining information at a time from said master controller, and including means for gradually sending out said NC machining information to each said NC machine tool and for synchronizing the NC machining information to and with the NC machine tools at a rate capable of being inputted to each said NC machine tool; and operation mode selecting means capable of selecting an operation mode from a plurality of operation modes, including:

a first operation mode in which said NC machining information from said master controller is interrupted and each said NC machine tool is independently operated by an associated NC unit of each said NC machine tool, a second operation mode in which the code number of said NC machining information correspoding to the workpiece code number of each said NC machne tool read out by said workpiece code number reading means is searched and taken out of said storage means of said master controller by said machining sequence storage means and the NC machining information of the searched code number is sent from said master controller, and a third operation mode in which said NC machining information is sent out from said mater controller in the machining sequences registered in said machining sequence storage means; and display means for indicating said workpiece code number read out by said workpiece code number reading means, said code number of the NC machining information registered by said machning sequence storage means, and the contents of the NC machining information sent from said master controller.

12. A machining system according to claim 11, wherein said master controller further comprises means for searching said NC machining information, so as to detect a desired portion of the NC machining information corresponding to said code number of the NC machining information stored in said master controller and means for sending the NC machining information after said desired portion to said machine controller; and a deficient tool determining means for a tool or tools deficient in said NC machine tool by comparing a present tool list which each said NC machine tool possesses with the list of necessary tools used in machining with the NC machining information sent out by said master controller.

13. A machining system according to claim 11, wherein said machine controller further comprises a remaining machining amount displaying means for displaying a remaining machining amount deermined on the basis of the overall machining amount of said NC machining information corresponding to the NC machining information code number received from said master controller, and a processed machining amount already processed by each said NC machine tool according to said NC machining information.

14. A machining system according to claim 1, wherein said machine controller is incorporated in one console integrally with said NC unit of said associated NC machine tool.

15. A machining system according to claim 11, wherein the operation mode selector consists of a switch for selecting one of the three modes of operation.

16. A machining system according to claim 11, wherein the single master controller is positioned at a location separated from said NC machine tools.

17. A machining system according to claim 11, wherein each said NC machine tool includes a machine tool (MT), a tool magazine (TM) and a machine tool controller (MTC) intermediatly arranged between said single master controller and its said associated NC machine tool.

18. A machining system according to claim 13, wherein the operation mode selector consists of a switch for selecting one of the three modes of operation.

19. A machining system according to claim 12, wherein said machine controller further comprises a remaining machining amount displaying means for displaying a remaining machining amount determined on the basis of the overall machining amount of said NC machining information corresponding to the NC machining information code number received from said master controller, and a processed machining amount already processed by each said NC machine tool according to said NC machining information.

20. A machining system according to claim 12, wherein said machine controller is incorporated in one console integrally with said NC unit of said associated NC machine tool.

* * * * *